United States Patent [19]

Ejiri et al.

[11] 4,258,393

[45] Mar. 24, 1981

[54] PICTURE PROCESSING METHOD

[75] Inventors: Kouichi Ejiri, Chiba; Keiji Sekigawa, Yokohama, both of Japan

[73] Assignee: Ricoh Company, Ltd., Tokyo, Japan

[21] Appl. No.: 90,110

[22] Filed: Nov. 1, 1979

[30] Foreign Application Priority Data

Nov. 6, 1978 [JP] Japan ................. 53-136435

[51] Int. Cl.$^3$ .............................. H04N 1/40
[52] U.S. Cl. .................... 358/283; 358/138; 358/280; 364/515
[58] Field of Search ........... 358/283, 280, 138; 364/515

[56] References Cited

U.S. PATENT DOCUMENTS

| | | | |
|---|---|---|---|
| 3,294,896 | 12/1966 | Young | 358/283 |
| 3,739,082 | 6/1973 | Lippel | 358/138 |
| 3,916,096 | 10/1975 | Everett | 358/283 |
| 4,184,206 | 1/1980 | Harano | 364/515 |
| 4,205,341 | 5/1980 | Mitsuya | 358/260 |

*Primary Examiner*—Howard W. Britton
*Attorney, Agent, or Firm*—Oblon, Fisher, Spivak, McClelland & Maier

[57] ABSTRACT

In a picture processing method according to the present invention, a picture element $S(i,j)$ to be processed is divided into four smaller picture elements $S_1(i,j)$ through $S_4(i,j)$. The density of each of the smaller picture elements is determined from the algebraic mean value of the densities of the picture element and the picture elements surrounding the firstly mentioned picture elements. Each smaller picture element $S_m(i,j)$ (m=1,2,3, and 4) is determined by a DITHER MATRIX $T(k,l)$ as $S_m(i,j)=1$ when $S_m(i,j) \geq T(k,l)$ and $S_m(i,j)=0$ when $S_m(i,j) < T(k,l)$ where, using Gauss' notation, $$k = i - 4[(i-1)/4]$$

and $$l = j - 4[(j-1)/4].$$

1 Claim, 7 Drawing Figures

FIG. 1

|   |   |   |
|---|---|---|
| A | B | C |
| D | a\|b<br>-E-<br>c\|d | F |
| G | H | I |

| 1 | 15 | 4 | 13 |
|---|----|---|----|
| 12 | 8 | 10 | 5 |
| 3 | 14 | 2 | 16 |
| 9 | 6 | 11 | 7 |

| 3 | 3 | 2 | 2 | 2 | 2 | 1 | 1 | 2 | 2 | 2 | 2 | 2 | 3 | 3 |
|---|---|---|---|---|---|---|---|---|---|---|---|---|---|---|
| 3 | 3 | 2 | 2 | 2 | 2 | 1 | 1 | 2 | 2 | 2 | 2 | 2 | 3 | 3 |
| 4 | 3 | 3 | 2 | 2 | 2 | 2 | 3 | 3 | 2 | 2 | 2 | 2 | 3 | 3 |
| 4 | 3 | 3 | 3 | 10 | 12 | 14 | 15 | 15 | 15 | 14 | 12 | 10 | 8 | 3 | 3 |
| 4 | 3 | 10 | 11 | 12 | 15 | 15 | 15 | 15 | 15 | 15 | 15 | 13 | 10 | 6 | 4 |
| 10 | 13 | 14 | 15 | 15 | 12 | 8 | 6 | 4 | 4 | 6 | 7 | 10 | 14 | 12 | 12 |
| 14 | 14 | 10 | 7 | 3 | 3 | 3 | 3 | 3 | 3 | 3 | 3 | 5 | 7 | 9 | 12 |
| 12 | 10 | 4 | 3 | 3 | 2 | 2 | 2 | 1 | 1 | 2 | 2 | 2 | 3 | 3 | 6 |
| 4 | 3 | 3 | 8 | 10 | 8 | 16 | 16 | 16 | 8 | 14 | 11 | 2 | 2 | 2 | 5 |
| 4 | 3 | 10 | 1 | 1 | 12 | 16 | 1 | 16 | 16 | 4 | 1 | 10 | 10 | 2 | 2 |
| 4 | 10 | 10 | 1 | 3 | 10 | 16 | 16 | 16 | 16 | 6 | 1 | 1 | 6 | 12 | 3 |
| 6 | 4 | 3 | 10 | 4 | 5 | 13 | 16 | 16 | 11 | 4 | 7 | 9 | 8 | 4 | 3 |
| 2 | 2 | 1 | 1 | 2 | 2 | 2 | 2 | 1 | 1 | 1 | 1 | 2 | 3 | 2 |
| 2 | 2 | 1 | 1 | 1 | 1 | 1 | 1 | 1 | 1 | 1 | 1 | 2 | 2 | 2 |
| 2 | 2 | 1 | 1 | 1 | 1 | 1 | 1 | 1 | 1 | 1 | 1 | 2 | 2 | 2 |
| 2 | 2 | 2 | 1 | 1 | 1 | 1 | 1 | 1 | 1 | 1 | 1 | 2 | 2 | 2 | 2 |

FIG. 4

PICTURE PROCESSING METHOD

BACKGROUND OF THE INVENTION

This invention relates to picture processing methods, and more particularly to an improvement of a half tone reproducing method using binary signals.

A DITHER method is well known in the art as a method of expressing a picture having half tones with binary signals. However, the method is disadvantageous in that smooth gradation of half tones cannot be obtained because the method is employed to reproduce low density.

SUMMARY OF THE INVENTION

Accordingly, an object of this invention is to provide a picture processing method by which smooth and natural gradation of half tones can be reproduced.

The foregoing object and other objects of the invention have been achieved by the provision of a picture processing method, in which a picture element $S(i,j)$ to be processed is divided into four smaller picture elements $S_1(i,j)$ through $S_4(i,j)$, the density of each of the smaller picture elements is determined from the algebraic mean value of the densities of the picture element and the picture elements surrounding the firstly mentioned picture elements, and each smaller picture element $S_m(i,j)$ (m=1, 2, 3 and 4) is determined by a DITHER MATRIX $T(k,l)$ as $S_m(i,j)=1$ when $S_m(i,j) \geq T(k,l)$ and $S_m(i,j)=0$ when $S_m(i,j) < T(k,l)$ where, using Gauss' notation, $$k = i - 4[(i-1)/4]$$

and $$l = j - 4[(j-1)/4].$$

The nature, utility and principle of the invention will become more apparent from the following detailed description when read in conjunction with the accompanying drawings.

BRIEF DESCRIPTION OF THE DRAWINGS

In the accompanying drawings:

FIG. 1 is a diagram for a description of the principle of this invention;

FIG. 2 is a diagram showing a DITHER matrix;

FIG. 3 is a diagram showing the density distribution of a picture to be processed;

FIG. 4 is a density distribution diagram of the picture of FIG. 3, the density of which is increased;

DETAILED DESCRIPTION OF THE INVENTION

One preferred embodiment of this invention will be described with reference to the accompanying drawings.

First, according to the invention, a picture element E among picture elements A through I is processed by being divided into smaller picture elements a through d, as shown in FIG. 1. That is, the density of each of the picture elements A through I is represented by the same symbols as those of the picture elements as follows:

$$a = (A + B + D + 5E)/18$$

$$b = (B + C + F + 5E)/18$$

$$c = (D + G + H + 5E)/18$$

$$d = (F + H + I + 5E)/18$$

Next, the smaller picture elements a through d are processed by utilizing a DITHER matrix $T(k,l)$. In other words, in the case where a picture to be processed is expressed by density levels of from 0 to 16, a matrix $T(k,l)$ is provided as the DITHER matrix $T(k,l)$. In this connection, the position of each of the smaller picture elements a through d being indicated by a matrix $S_m(i,j)$ (m=1, 2, 3, 4), the following relations are defined to obtain (k,l) from (i,j).

$$k = i - 4[(i-1)/4]$$

$$l = j - 4[(j-1)/4]$$

where [x] is the Gauss' notation which represents an integer not exceeding x.

According to the invention, with respect to each picture element $S_m(i,j)$, when $S_m(i,j) \geq T(k,l)$, $S_m(i,j) = 1$, and
when $S_m(i,j) < T(k,l)$, $S_m(i,j) = 0$.

Figure 4:
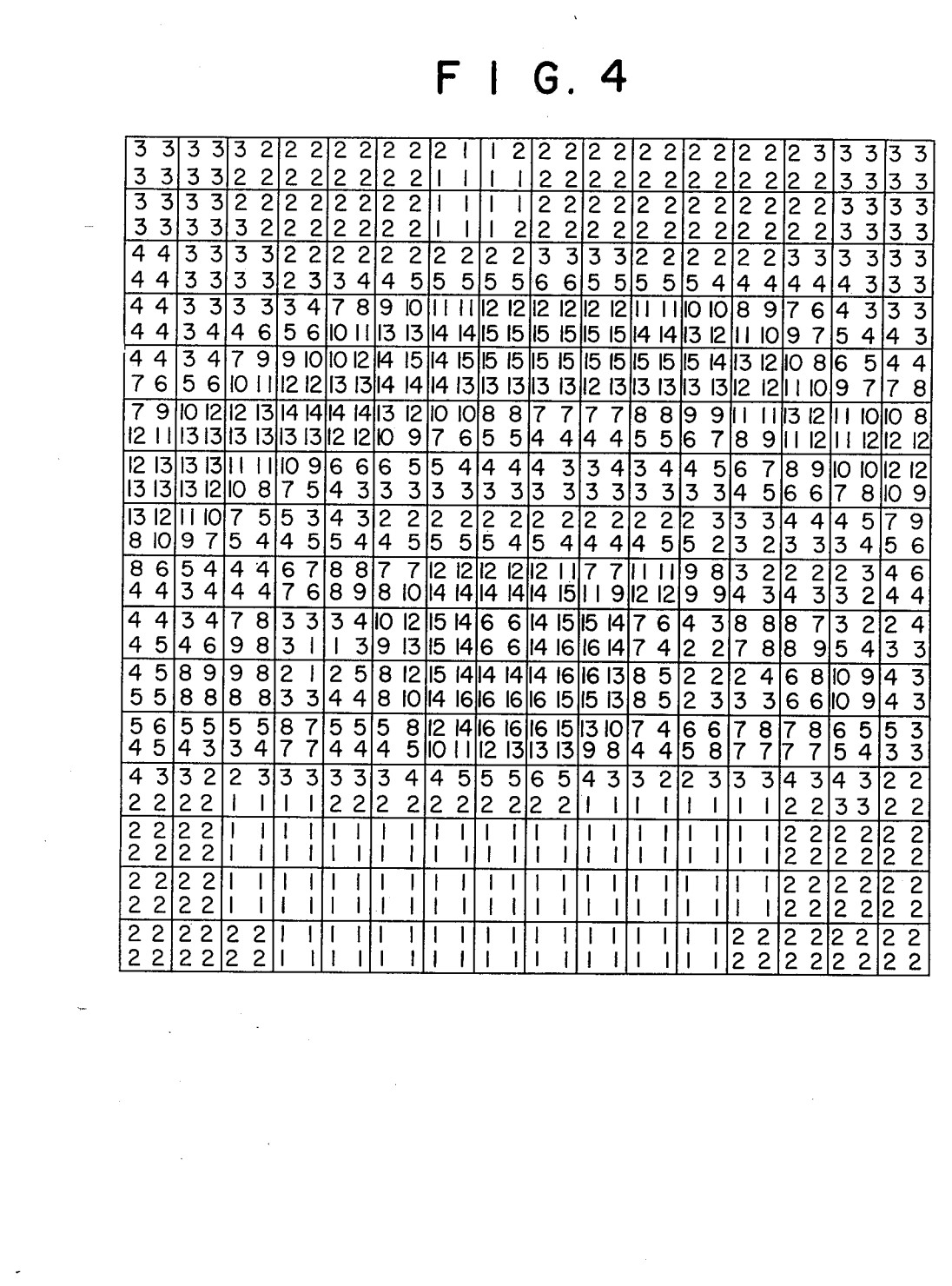
Figure 5:
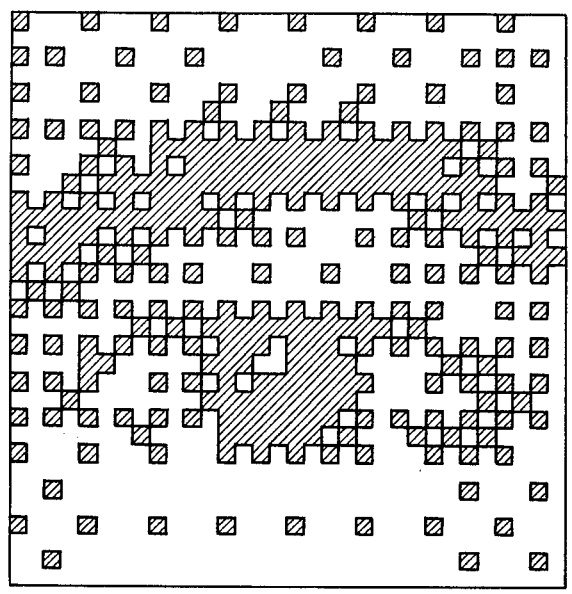
FIG. 5 shows a picture processed according to the invention.
Figure 6:
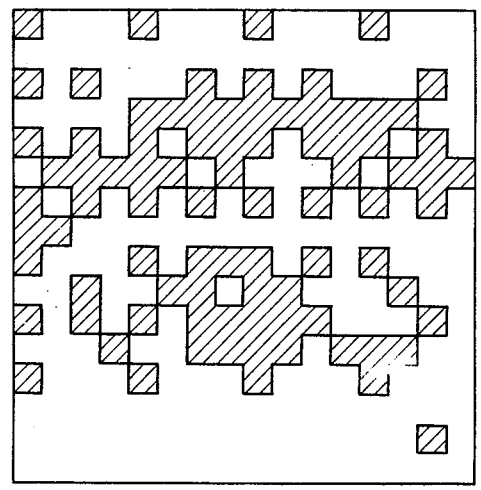
FIG. 6 shows a picture processed according to a conventional method.

Now, an actual example thereof will be described. If a picture $S(i,j)$ having a density distribution as shown in FIG. 3 is subjected to four-division, then a picture $S_m(i,j)$ as shown in FIG. 4 is obtained. When the picture $S_m(i,j)$ is subjected to a process utilizing the DITHER matrix, then it is converted as shown in FIG. 5. If a DITHER matrix method is applied to the picture shown in FIG. 3, the result is unsatisfactory as shown in FIG. 6.

Figure 7:
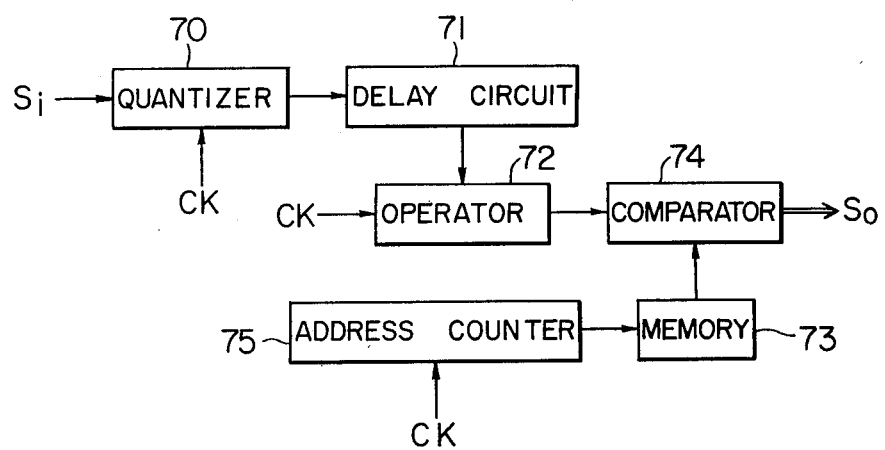
FIG. 7 is a block diagram showing a device for practicing a picture processing method according to the invention.

A device for performing the above-described process is as shown in FIG. 7. That is, the device comprises a quantizer 70, a delay circuit 71, an operator 72, a memory 73, a comparator 74 and a counter 75.

The quantizer 70 operates to quantize a video input signal Si which is obtained by scanning a picture, into sixteen (16) levels in response to clock pulses CK, as was described above.

The delay circuit 71 is to pick up signals necessary for the operation, and the density $S_m(i,j)$ of each of the smaller picture elements a, b, c and d in FIG. 1 is obtained by the operator 72.

The DITHER matrix shown in FIG. 2 is stored in the memory 73, out of which necessary signals $T(k,l)$ are read suitably with the aid of the address counter 75.

The comparator 74 compares the output $S_m(i,j)$ of the operator 72 with the output $T(k,l)$ of the memory 73, to determine $S_m(i,j) = 0$ or 1 which is employed as an output signal $S_0$.

The operator 72 and the address counter 75 are operated with the aid of the clock pulses CK.

In the above-described embodiment, the DITHER matrix method is employed; however, the same effect can be obtained by increasing the density of the matrix in the front stage of a conventional half tone processing method (such as a dynamic error diffusion method, or a stationary pattern method).

Thus, according to the invention, a picture processing method in which half tones can be smoothly reproduced by binary signals can be obtained.

What is claimed is:

1. A picture element processing method, in which a picture element $S(i,j)$ to be processed is divided into four smaller picture elements $S_1(i,j)$ through $S_4(i,j)$, the density of each of said smaller picture elements $S_1(i,j)$ through $S_4(i,j)$ is determined from the algebraic mean value of the densities of said picture element $S(i,j)$ and picture elements surrounding said picture element, and each smaller picture element $S_m(i,j)$ ($m = 1, 2, 3$ and $4$) is determined by a DITHER MATRIX $T(k,l)$ as $S_m(i,j) = 1$ when $S_m(i,j) \geq T(k,l)$ and $S_m(i,j) = 0$ when $S_m(i,j) < T(k,l)$ where, using Gauss' notation, $k = i - 4[(i-1)/4]$ and $l = j - 4[(j-1)/4]$.

* * * * *